United States Patent
Shum et al.

(10) Patent No.: US 7,184,063 B2
(45) Date of Patent: Feb. 27, 2007

(54) ADAPTIVE COLOR SCHEMES

(75) Inventors: Heung-Yeung Shum, Beijing (CN); Ying-Qing Xu, Beijing (CN); Qi Ren, Hang Zhou (CN)

(73) Assignee: Microsoft Corporation, Redmond, WA (US)

( * ) Notice: Subject to any disclaimer, the term of this patent is extended or adjusted under 35 U.S.C. 154(b) by 47 days.

(21) Appl. No.: 10/932,555

(22) Filed: Sep. 1, 2004

(65) Prior Publication Data

US 2006/0044324 A1 Mar. 2, 2006

(51) Int. Cl.
*G09G 5/00* (2006.01)

(52) U.S. Cl. ...................... 345/629; 345/640

(58) Field of Classification Search .............. 345/629, 345/634, 636, 640
See application file for complete search history.

(56) References Cited

U.S. PATENT DOCUMENTS

| | | | |
|---|---|---|---|
| 5,644,692 A * | 7/1997 | Eick | 715/833 |
| 6,433,785 B1 * | 8/2002 | Garcia et al. | 345/531 |
| 6,788,308 B2 * | 9/2004 | Reavy et al. | 345/617 |
| 2002/0118210 A1 * | 8/2002 | Yuasa et al. | 345/589 |
| 2005/0012754 A1 * | 1/2005 | Inuzuka et al. | 345/555 |

* cited by examiner

*Primary Examiner*—Ulka Chauhan
*Assistant Examiner*—Kevin Xu
(74) *Attorney, Agent, or Firm*—Microsoft Corporation

(57) ABSTRACT

Techniques are described for adaptive changing a displayed foreground color when a conflict between the displayed foreground color and an extracted background color is detected. Upon detection of such a conflict, a new foreground color is selected in accordance with a predetermined legibility criterion. That is, a color pool candidate may be considered to be a viable foreground color if a legibility value for the candidate color in relation to the extracted background color exceeds a predetermined legibility threshold value.

5 Claims, 8 Drawing Sheets
(2 of 8 Drawing Sheet(s) Filed in Color)

ADAPTIVE COLOR SCHEMES

FIELD

Adapting color schemes relative to surrounding color patterns are described herein.

BACKGROUND

On-screen features including, at least, menus, screen designs, keyboard commands, command language, and online help may be collectively regarded as a "user interface." A user interface (also referred to as "UI") may define how a user interacts with applications using a display corresponding to a particular computing device. However, as the visual effects related to respective features of a user interface become increasingly more innovative, sophisticated, and versatile (i.e., capable of implementation in combination with or in addition to other features), users may experience difficulty visually distinguishing one feature from another.

More particularly, in order for the capabilities of a user interface to be fully exploited, at least in terms of functionality and speed, legibility of the visual features of the user interface is of utmost importance. Of course, legibility is critical for virtually all processor-based applications that require user interaction. The interfaces for such applications may be displayed on a multitude of display devices. Such display devices may be as small as a wristwatch, and may further include multiple images and/or text overlapping each other. The images and text may use any color from a color palette that is determined by the display capabilities of the device (e.g., 256 predefined RGB values from 0 to 255). Thus, legibility may not be assured from one display device to another without special considerations.

SUMMARY

Adaptive color schemes are described herein.

In a user interface or media presentation environment, a technique is provided to adaptively change a foreground color when a legibility conflict is detected between a displayed background color and a displayed foreground color. The new foreground color is selected in accordance with a predetermined legibility criterion that takes into consideration, at least, a luminance contrast, a hue contrast, and a subjective classification contrast between the displayed background and foreground colors.

BRIEF DESCRIPTION OF THE DRAWINGS

The detailed description that follows is described with reference to the accompanying figures.

The patent or application contains at least one drawing executed in color. Copies of this patent or patent application publication with color drawing(s) will be provided by the Office upon request and payment of the necessary fee.

DETAILED DESCRIPTION

The following description is directed to techniques for contrasting background and foreground colors in, e.g., a user interface (UI) or media presentation (e.g., video or slide presentation) environment. Also, the description may be directed to a user interface or a media presentation for which a contrast between displayed foreground colors and background colors are measured according to a pre-established criterion. Thus, the UI or media presentation may include an adaptive color scheme for at least displayed foreground color that may be updated to provide a user with clear and legible display environment. Although the example embodiments described herein may be directed towards either a UI environment or a media presentation, a UI environment will be described as a non-limiting example.

The present description of example embodiments includes references to the terms "user interface," "application," "desktop," and "wallpaper." The following definitions of these terms are provided only as example settings to which embodiments, as described herein, may be applied. That is, these definitions are in no way intended to be limiting of the example embodiments described herein.

As set forth above, a "user interface" (UI) may include on-screen features of a computing device including, but not limited to, menus, screen designs, keyboard commands, command language, and online help features. Thus, a UI may define how a user interacts with applications using a display corresponding to a particular computing device.

An "application" may refer to an executable file that is run on a local computing device or an executable device that is run on one or more remote computing devices but has a visual component thereof displayed locally, via a network.

A "desktop" may be regarded as the on-screen background of a display device that includes icons representing applications available to a user of the computing device. A "desktop" may be customized by a user in terms of arrangement and appearance.

"Wallpaper" may refer to a pattern or picture displayed as the screen or display background in a user interface. That is, a "desktop" may be displayed on top of "wallpaper," and thus "wallpaper" may be interchangeably referred to as "background." As part of an operating system (also referred to as an "OS"), for instance, a "desktop" may come with several "wallpaper" choices from which a user may choose. Alternatively, "wallpaper" may be available from third party sources or even scanned or downloaded by a local user.

Figure 1:
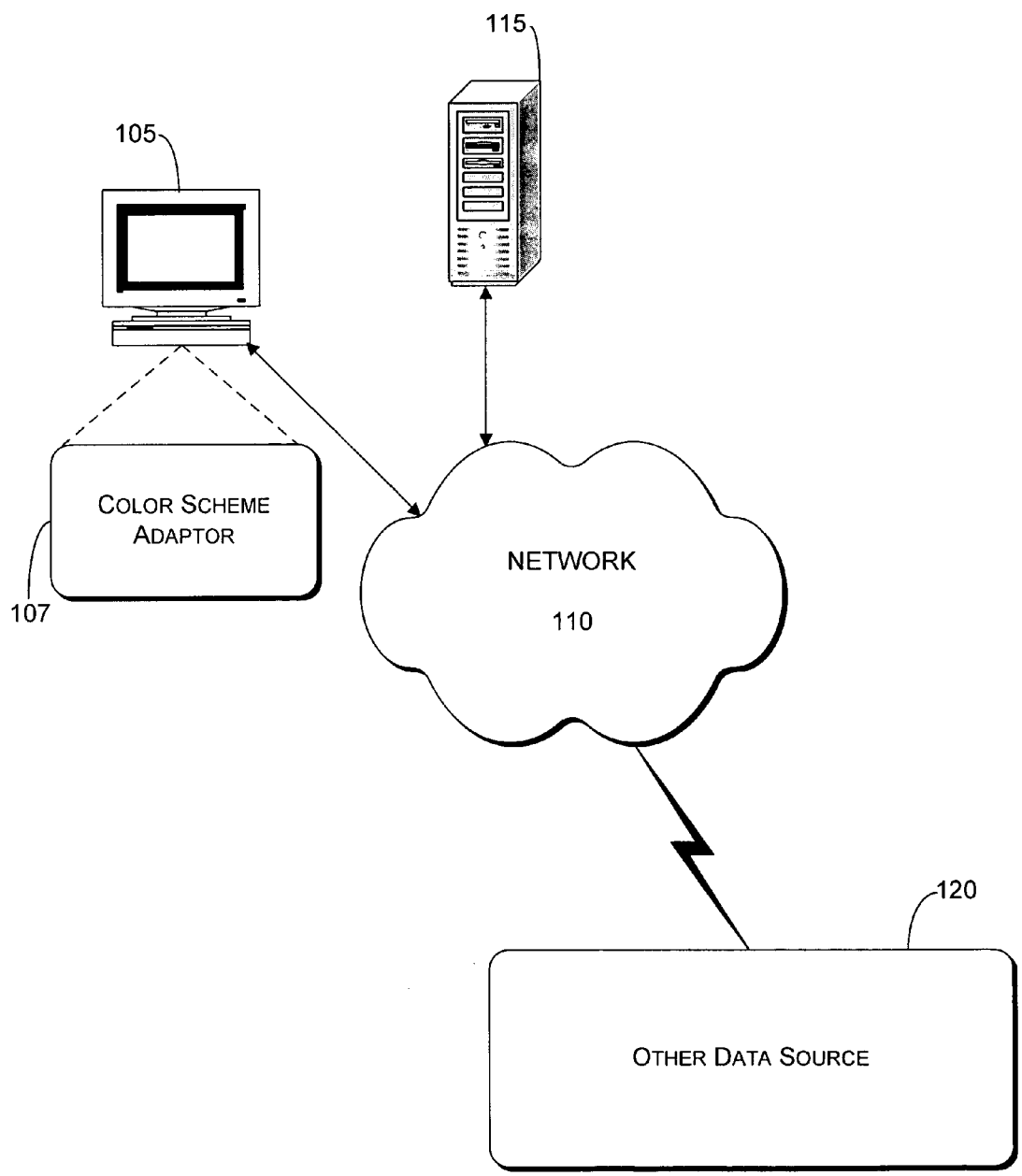
FIG. 1 shows a computing device for implementing computer graphic techniques utilizing example embodiments of adaptive color schemes as described herein.

FIG. 1 shows an example of computing device 105 having color scheme adapter component 107 to adaptively change a foreground color in a UI environment. The UI may be associated with an application that is run locally on computing device 105 or on one or more computing devices over network 110, such as server 115 and data source 120.

Computing device 105 may be any of a variety of conventional computing devices that include, but are not limited to, a personal computer (PC). According to the example embodiments described herein, computing device 105 may further be any one of a PC or a network-associated device such as a laptop computer, personal digital assistant (PDA), smartphone, watch, etc., which may be in communication with a network 110 by a wired and/or wireless link. An example embodiment of a client device 105 is described in further detail below with reference to FIG. 8.

Either of devices 115 and 120 may be a server device (e.g., network server, application server, or blade server) that provides any of a variety of data and/or functionality to computing device 105. A network server is a server device that delivers content to computing device 105 by way of network 110. Such content may include web content coded in hypertext markup language (HTML), which may also contain JavaScript code or other commands. Further, either of devices 115 and 120 may be used in other networks that are part of The World Wide Web (e.g., where the network 110 includes The Internet), as well as in other networks that are not part of the World Wide Web, such as an intranet.

Figure 2:
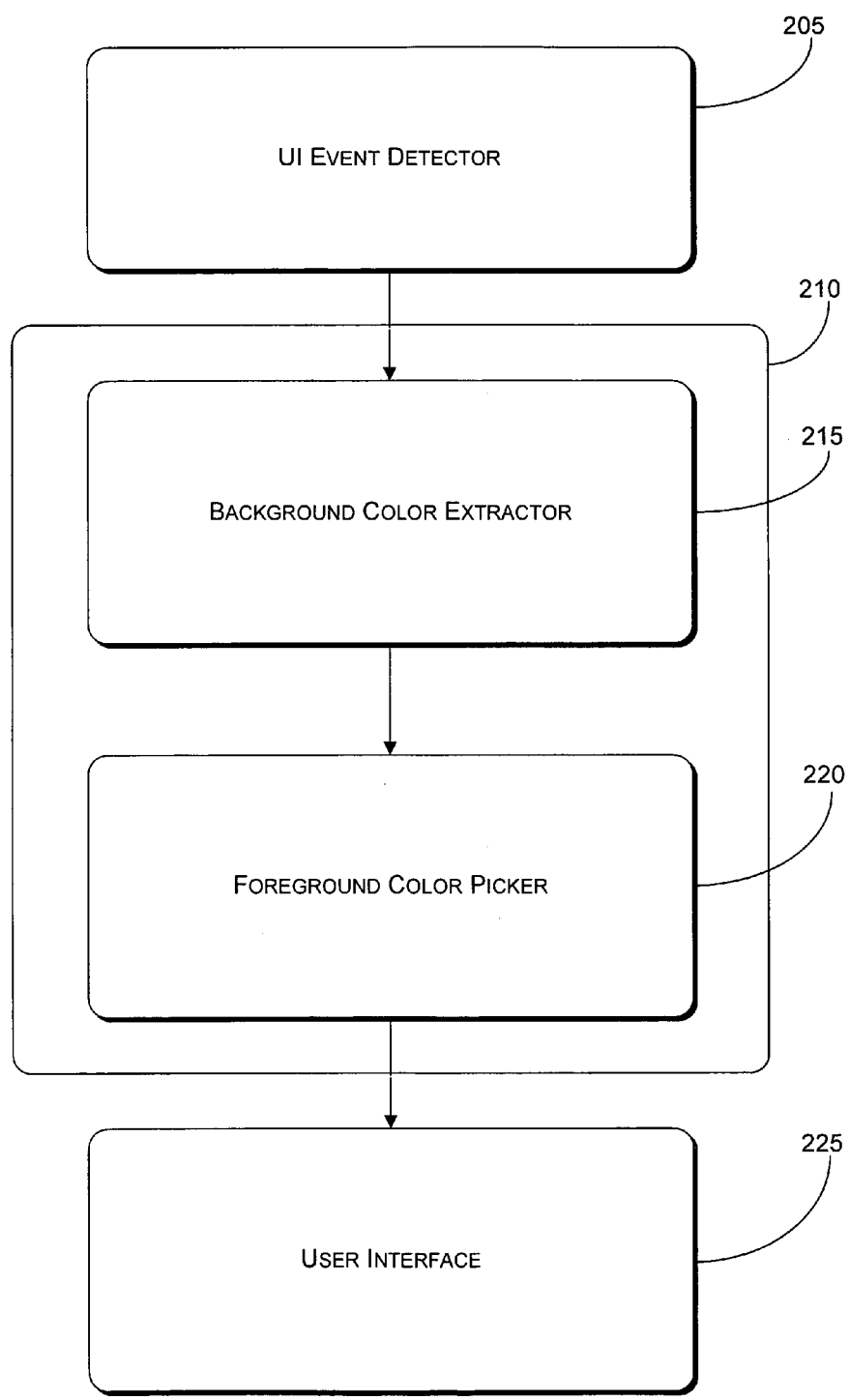
FIG. 2 illustrates examples of functional components that implement adaptive color schemes.

FIG. 2 shows functional components that comprise at least a portion of an example embodiment of color scheme adaptor 107 to adaptively change a foreground color in a user interface environment. The example of FIG. 2 is described with reference to the example of FIG. 1, in which a color scheme adaptor 107 is implemented on computing device 105 for a UI environment for an application that is either run locally on computing device 105 or over network 110, originating from at least one of devices 115 and 120.

In the example of FIG. 2, component 205 is a UI event detector, which may detect a UI event, which is an occurrence that may initiate implementation of color scheme adaptation in accordance with at least one example embodiment of color scheme adaptor 107. Examples of a UI event that is detectable by component 205 include, but are not limited to: the initialization (or refreshing) of a "desktop" on computing device 105; a user changing the background on the display portion of computing device 105; a user adding or rearranging at least one feature of the "desktop" on computing device 105; or the passage of a threshold amount of time.

Component 210 includes background color extractor 215 and foreground color picker 220. In alternative embodiments, background color extractor 215 and foreground color picker 220 may be separate components unto themselves either in a common computing device or in remote computing devices.

Background color extractor 215 may collect background colors that are significant enough to affect the legibility of similarly-colored "desktop" fonts or icons displayed thereon. Further, background color extractor 215 may cluster collected background colors that are determined to be similar to one another in accordance with at least an established criterion.

In accordance with at least one example embodiment, foreground color picker 220 may select a foreground color, typically for "desktop" font or icon, to provide a sufficient contrast to the colors extracted by background color extractor 215, based on an established legibility criterion. Thus, background color extractor 215 and foreground color picker 220 contribute to a legible UI environment 225.

Figure 3:
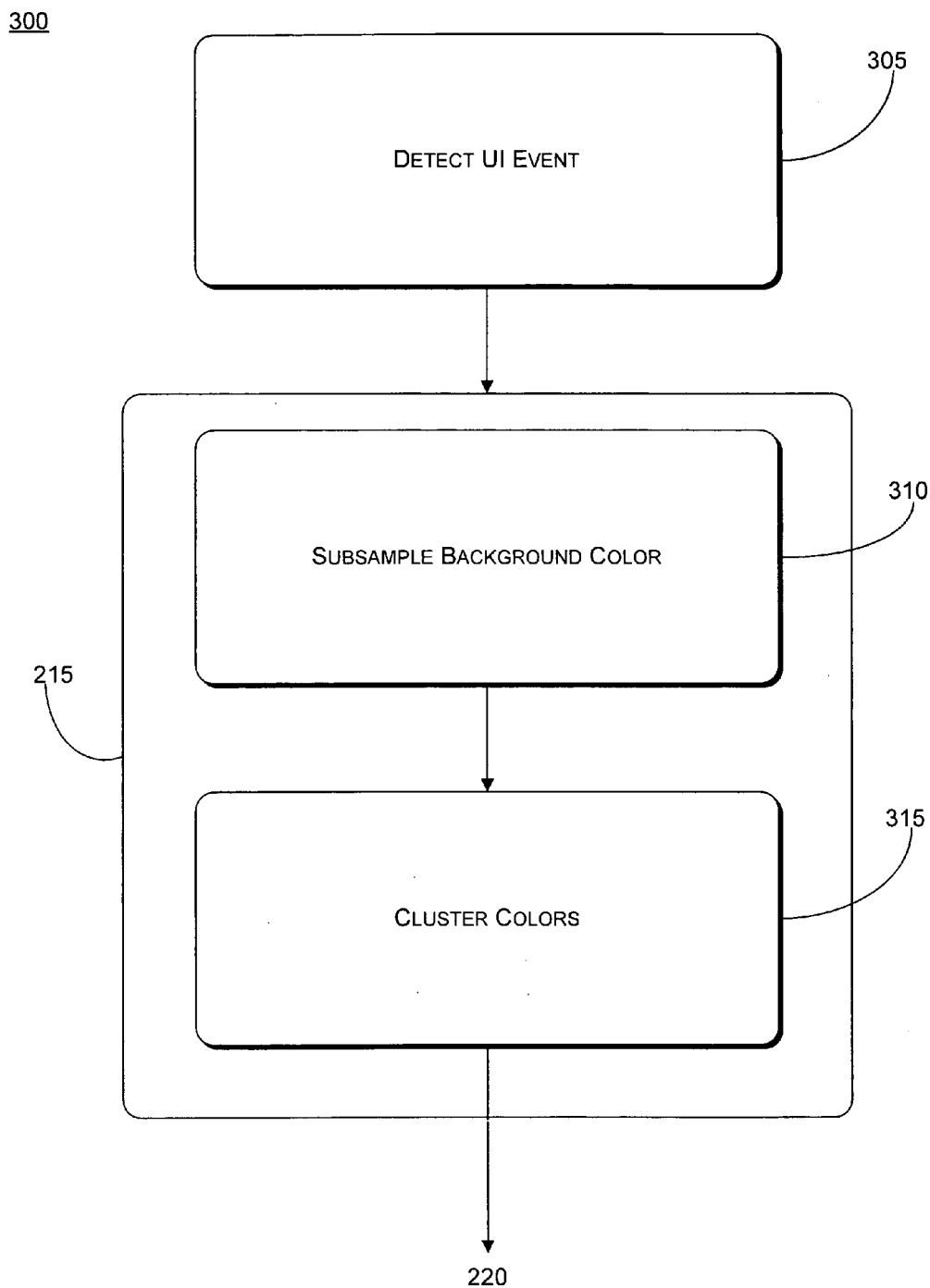
FIG. 3 illustrates a sample processing flow corresponding to at least one of the components shown in the example of FIG. 2.

FIG. 3 illustrates an example processing flow 300 relating to, primarily, background color extractor 215 (see FIG. 2). In processing flow 300, after any of the aforementioned UI events has been detected 305, background color extractor 215 may sample any of the background colors 310 displayed on local computing device 105 (see FIG. 1). To avoid processing substantially every pixel in the displayed background colors, the aforementioned sampling may be done by a factor of $f_x$ in x axis and $f_y$ in y axis. The robustness of the processing may increased by increasing the aforementioned sampling factors.

The parameters $f_x$ and $f_y$ may be pre-defined according to font spatial frequency. Spatial frequency relates to, at least, the metrics (e.g., character box size, ascent, descent heights, etc.) and appearance classes (e.g., italics and bold) of fonts and/or icons that may be detected on top of sampled portions of the background. For example, the background of an 8-point Tahoma-style font detected on the displayed "desktop" may be sampled by a sample factor $f_x=f_y=2$ for normal appearance, or $f_x=f_y=4$ if the appearance class is "bold." Such examples of sampling parameters are provided only as examples, and are not intended to be limiting. Furthermore, the parameters $f_x$ and $f_y$ do not necessarily have to be symmetrical as in the given example. Rather, the parameter values are influenced by a desire to provide a sufficient color sample while maintaining robust processing, and therefore may be subject to modification.

Background color extractor 215 may further cluster together similar colors 315 that are extracted from the sampled background. The clustering may be performed using a homogeneous quantization methodology known in the art, with quantization steps $E_r=E_g=E_b=32$ in the R, G, B (red, green, blue) channels respectively. The above values of $E_r$, $E_g$, and $E_b$ are provided as examples only, and are not intended to be limiting in any manner. The average color of each cluster may be regarded as the representative color of the cluster, and the size, in terms of pixels, of the cluster may be regarded as the weight of the representative color in the background.

As stated above, similar background colors may be clustered together. As an example, to determine whether sampled background colors $C_1$ and $C_2$ are similar, consideration is given to the RGB characteristics of $C_1$ and $C_2$ (i.e., $C_1(R_1, G_1, B_1)$ and $C_2(R_2, G_2, B_2)$), as well as the above quantization steps of $E_r$, $E_g$, and $E_b$. $C_1$ and $C_2$ may be deemed be similar if $(R_1/E_1)=(R_2/E_r)$, $(G_1/E_g)=(G_2/E_g)$, and $(B_1/E_b)=(B_2/E_b)$. It is noted that, for alternative embodiments, $R_i$, $G_i$, $B_i$ are amounts of R, G, B channels of example color $C_i$ respectively and range from 0 to 255.

Figure 4:
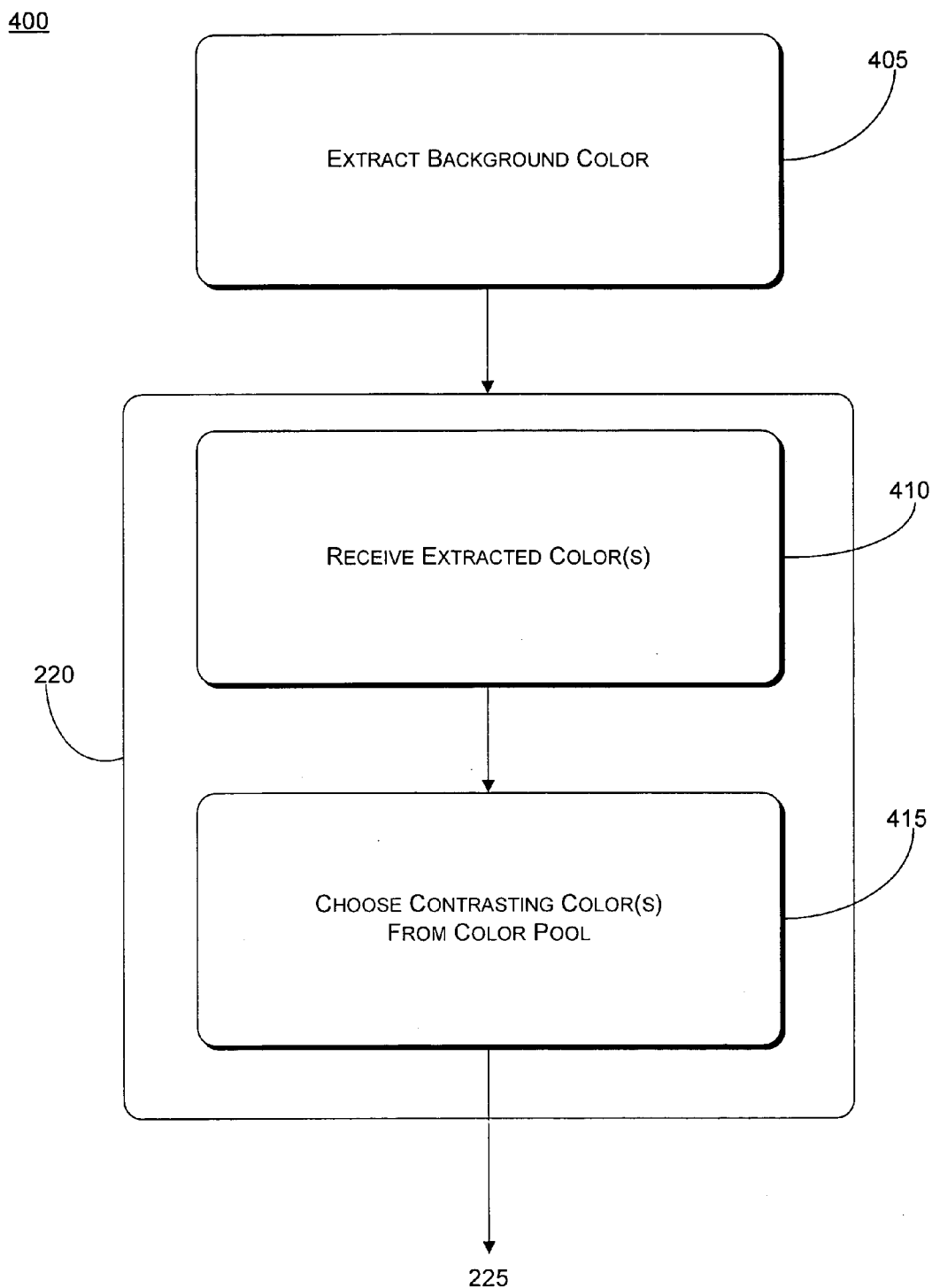
FIG. 4 illustrates another sample processing flow corresponding to at least one of the components shown in the example of FIG. 2.

FIG. 4 illustrates an example processing flow 400 relating to, primarily, foreground color picker 220 (see FIG. 2). In processing flow 400, foreground color picker 220 receives 410 the background color or colors extracted 405 from the background.

Foreground color picker 220 may then enable a selection of one or more colors that sufficiently contrast the received background color or colors to provide a legible UI environment according to predefined legibility criterion. To do so, foreground color picker 220 may access a color pool contained in foreground color picker 220 that is in another component of the same computing device as foreground color picker 220 or is in one or more remote computing devices (e.g., server). The color pool may be composed of a discrete set of colors, which are selected according the application for which a UI is displayed. Thus, a color selected from the color pool for the foreground of the UI environment may be deemed to meet predetermined legibility requirements. The following is an example of such a color pool, which consists of white, black, and primary and secondary colors in a RYB (red, yellow, blue) color wheel. Further descriptive details of such a color wheel are described further below with reference to FIG. 5.

| Colors in pool | | Quantitative definition | | |
|---|---|---|---|---|
| | WHITE | R = 255 | G = 255 | B = 255 |
| | BLACK | R = 0 | G = 0 | B = 0 |
| Primary | RED | R = 255 | G = 0 | B = 0 |
| | YELLOW | R = 255 | G = 255 | B = 0 |
| | BLUE | R = 0 | G = 0 | B = 255 |
| Secondary | ORANGE | R = 255 | G = 128 | B = 0 |
| | LIGHT-GREEN | R = 0 | G = 255 | B = 128 |
| | MAGENTA | R = 255 | G = 0 | B = 255 |

An example of the legibility criterion and an example technique for selecting a foreground color, as used by foreground color picker 220, are described below in further detail.

In particular, to measure legibility of foreground colors relative to the sampled background, the legibility criterion considers, at least, colorimetric and perceptional quantities. Such quantities include luminance, hue, brightness, lightness, chroma, and saturation.

Luminance may be considered to be the amount of brightness given off by a pixel or area on a display surface. Luminance is measured in lumens. The luminance at a point of a surface and in a given direction is the quotient of the luminous intensity in the given direction of an infinitesimal element of the surface containing the point under consideration, by the orthogonally projected area of the surface element on a plane perpendicular to the given direction.

Hue may be considered to be the dominant wavelength of a color, i.e., the attribute of a color perception denoted by blue, green, red, etc.

Brightness may be considered to be the light level on the display device. In other words, brightness is the attribute of a visual sensation according to which a given visual stimulus appears to be more or less intense.

Lightness may be considered to be the attribute of a visual sensation of a display portion that appears to emit more or less light in proportion to the light emitted by a similarly illuminated area perceived as a "white" stimulus. Thus, lightness may be referred to as relative brightness.

Chroma (or "chrominance") may be considered to be the attribute of a visual sensation which permits a judgment to be made of the degree to which a chromatic stimulus differs from an achromatic stimulus of the same brightness.

Saturation may refer to the amount of blackness in a display. That is, saturation is the attribute of a visual sensation which permits a judgment to be made of the degree to which a chromatic stimulus differs from an achromatic stimulus regardless of their brightness.

More particularly, according to the example embodiments described herein, the legibility criterion are based on luminance contrast, hue contrast, and a "warm/cold" contrast.

The luminance contrast ($\Delta Y$), which may be regarded as the relative luminance between a foreground color and a background color, may be measured using the RGB parameters of the extracted foreground and background colors. $\Delta Y$ may be measured using the following formula provided by James, et al. in *Computer Graphics: Principles and Practice*, Addison-Wesley, 1995:

$$\Delta Y = |Y_{foreground} - Y_{background}|, \text{ where } Y = 0.30R + 0.59G + 0.11B.$$

The hue contrast ($\Delta H$) may be regarded as the contrast between chromatic colors. To quantitatively measure the hue contrast, each of foreground color is converted to an "HSL" (hue, saturation, lightness) color space using an algorithm provided by James, et al. The conversion of colors to the HSL color space is known in the art, and therefore a description thereof is not provided here. Thus, it is known that hue (H) ranges from 0 to 360, saturation (s) and lightness (l) range from 0.00 to 1.00. Further, chroma (c) may be approximated as follows, based on a relationship that saturation may be defined as chroma divided by lightness: $c = s \cdot (1 - |l - 0.5|/0.5)$. Accordingly, hue contrast may be determined by:

$$\Delta H = c_{avg} \cdot \text{Slope}(|H_{foreground} - H_{background}|), \text{ where}$$

$$c_{avg} = (c_{foreground} + c_{background})/2; \text{ and}$$

$$\text{Slope}(d) = \begin{cases} 0, & d < 30 \\ d/360, & 30 \le d \le 60 \\ (d - 60)/36 + 1 - 6, & 60 \le d < 90 \\ 1, & d \ge 90 \end{cases}$$

The "warm/cold" contrast ($\Delta W$) may refer to the contrast between a foreground color and a background color based on the classification of a respective color as being "warm" or "cold." Of course, the example embodiments described herein are not beholden to terminology such as "warm" and "cold" colors. Rather, the terminology, for which alternatives may be provided, is provided to more clearly illustrate any contrast in colors provided by the embodiments described herein.

Figure 5:
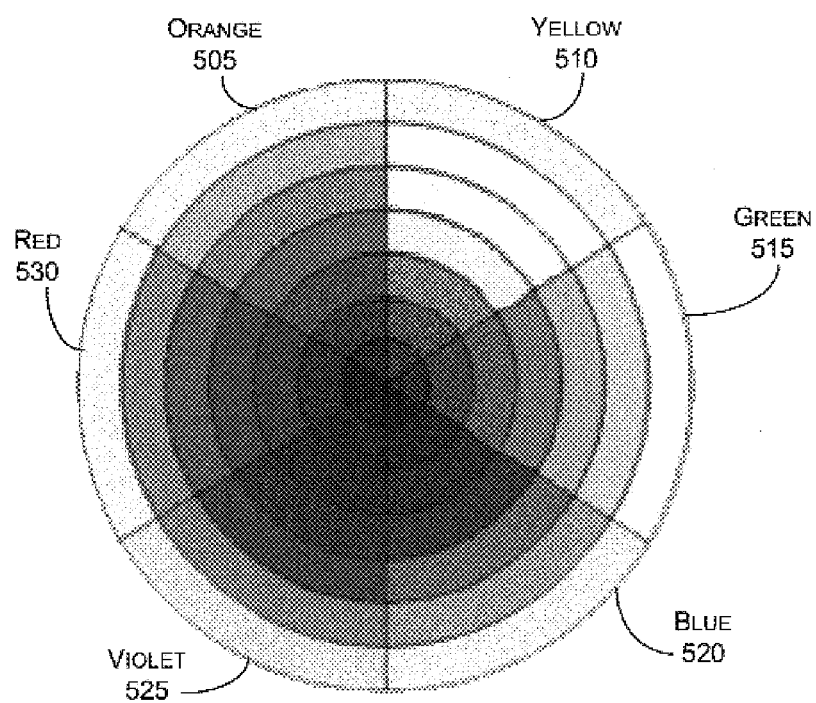
FIG. 5 shows a color wheel to illustrate a classification of colors according to at least one example embodiment.

FIG. 5 shows an RYB color wheel 500 that depicts "cold" colors blue 520, green 515, and violet 525, as well as "warm" colors red 530, yellow 510, and orange 505. The classification of these colors as being "cold" or "warm" is based on a determination of the hue, lightness, and saturation of the respective colors. For example, a light shade of green may appear to be "cold" while a darker shade of green may not, although both shades may have the same hue. The example embodiments defer to the fuzzy logic depicted by L. Zedah, *Outline of a New Approach to the Analysis of Complex Systems and Decision Processes*, IEEE Transactions on Systems, Man, and Cybernetics, SMC-3, pp. 28–44, 1973., since the "cold" and "warm" characteristics of colors may be considered to be subjective.

Figure 6A:
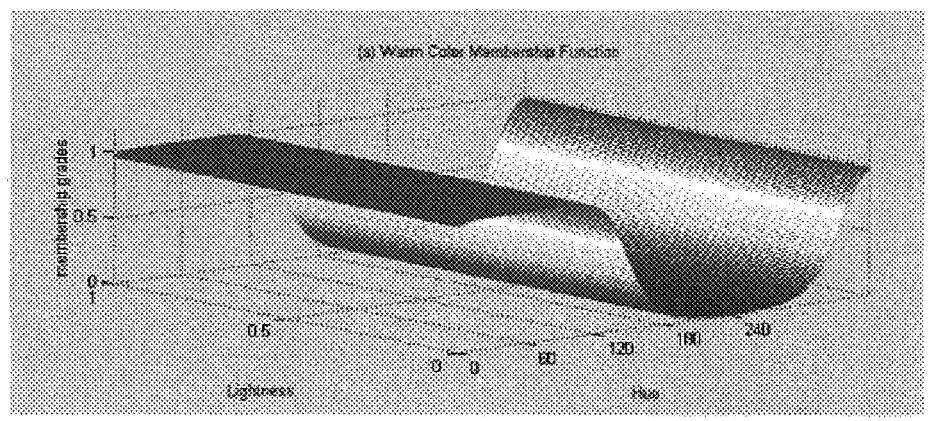
FIGS. 6A and 6B show bell curves depicting membership functions for colors selected according to at least one example embodiment.
Figure 6B:
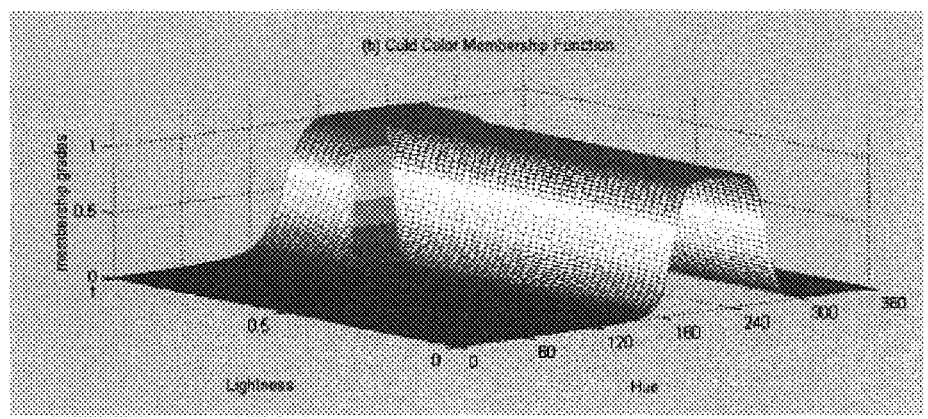

FIGS. 6A and 6B show a bell curve depicting the membership functions ($\delta$) for "warm" and "cold" colors, respectively. The analytic formulas for the membership functions are as follows:

$$\delta_{warm}(\text{color}) = gbell_{a=90,\ b=4,\ c=60}(\text{color}.h)$$

$$\delta_{cold}(\text{color}) = \text{Min}(\text{Max}(gbell_{a=41.5,b=4,c=228.5}(\text{color}.h),\\ gbell_{a=75,b=4,c=225}(\text{color}.h)), gbell_{a=02,b=4,c=1})$$

wherein, $$gbell_{a,b,c}(x) = \{1/[l + ((x-c)/a)^{2b}]\}.$$

Based on the membership functions shown in FIGS. 6A and 6B, an example of quantitative definitions of "warm" and "cold" colors are as follows:

| Classification | Colors | Quantitative Definition |
| --- | --- | --- |
| WARM | red, orange, yellow, yellow-green, red-violet | H ∈ [0, 150] ∪ [330, 360] |
| COLD | blue, green-blue, blue-violet, light green, light violet | H ∈ [187, 270] or H ∈ (150, 187) ∪ (270, 300) and l ∈ [0.8, 1] |
| none | other | other |

According to one example embodiment, black may be regarded as a "cold" color; while white may be regarded as a "warm" color when accompanying yellow, but alternatively may be regarded as a "cold" color when accompanying cyan.

With regard to chromatic colors, the "warm/cold" contrast ΔW may be defined as follows:

$$\Delta W = \begin{cases} 1, & Classification_{foreground} \neq Classification_{background} \\ 0.5 & ForegroundOrBackgroundNoClassication \\ 0, & Classification_{foreground} = Classification_{background} \end{cases}$$

The legibility criterion (L), according to at least one example embodiment, is based on luminance contrast, hue contrast, and "warm/cold" contrast. More particularly, $L(C_{foreground}, C_{background})$ may be regarded as the legibility value with regard to a foreground color candidate ($C_{foreground}$), from the aforementioned color pool, and an extracted background color ($C_{background}$). $L(C_{foreground}, C_{background})$ may be determined as follows:

$$L(C_{foreground}, C_{background}) = w_y \cdot \Delta Y + w_h \cdot \Delta H + w_w \cdot \Delta W.$$

$w_y$, $w_h$, and $w_w$ are weights respectively corresponding to the luminance contrast, hue contrast, and "warm/cold" contrast.

By the example embodiment, if the value $L(C_{foreground}, C_{background})$ exceeds a predetermined threshold value, the contrast between foreground color candidate ($C_{foreground}$) and extracted background color ($C_{background}$) is deemed to be sufficient to provide a legible UI experience to a user. That is, if $L(C_{foreground}, C_{background})$>(predetermined threshold value), $C_{foreground}$ is readable over $C_{background}$. Conversely, if $L(C_{foreground}, C_{background})$<(predetermined threshold value), the contrast between foreground color candidate ($C_{foreground}$) and extracted background color ($C_{background}$) is deemed to be insufficient to provide a legible UI experience to a user, and therefore another candidate for $C_{foreground}$ should be considered.

The aforementioned predetermined threshold value may be a configurable parameter, predetermined by experimentation. The threshold value may be configured in accordance with a subjective standard of acceptable contrast between a displayed background color and foreground color. Thus, as a desired contrast between the displayed background and foreground colors increases, the lower the threshold value becomes.

By way of example, foreground color picker 220 may determine $L(C_{foreground}, C_{background})$ for color pool candidates for $C_{foreground}$ and extracted an background color $C_{background}$. Each color pool candidate for $C_{foreground}$ may be assigned properties including, but not necessarily restricted to, a "score" and a "conflict number." A "score" for a particular color pool candidate $C_{foreground}$ may be considered to be a sum of legibility values of all possible pairs of ($C_{foreground}, C_{background}$) in which $C_{background}$ may be any of the extracted background colors. A "conflict number" for the particular color pool candidate $C_{foreground}$ may be considered to be the number of pairs of ($C_{foreground}, C_{background}$) for which $L(C_{foreground}, C_{background})$<(predetermined threshold value), i.e., ($C_{foreground}, C_{background}$) do not sufficiently contrast to provide a user with a legible UI experience.

Color picker 220 may pick a foreground color $C_{foreground}$ from the color pool as follows: pick the color pool candidate having a conflict number of zero; pick the color pool candidate having the highest score among multiple color pool candidates having a conflict number of zero; or pick the color pool candidate having the lowest conflict number if none of the color pool candidates have a conflict number of zero.

The legibility criterion (L) is a linear composition of more than one relation between the foreground and background colors of a UI environment, and is provided in an attempt to emulate human perceptive requirements for legibly viewing the UI. Therefore, the weights $w_y$, $w_h$, and $w_w$ may be selected to approach the desired perception criterion. According to an example embodiment, the weights are assigned the values of $w_y$=0.7, $w_h$=0.1, and $w_w$=0.3. Such values are provided for an example embodiment only, and are not intended to be limiting in any manner.

More particularly, the weights may be derived using a learning-based approach. For instance, using a training set of 800 pairs of colors representing sample foreground and background colors, the weights may be derived to ensure that a foreground color is picked that provides sufficient contrast to an extracted background color. Further, as the training sets of colors are varied, it may become desirable to modify or update the weights in order to pick the most suitable foreground color relative to the extracted background color.

Figure 7:
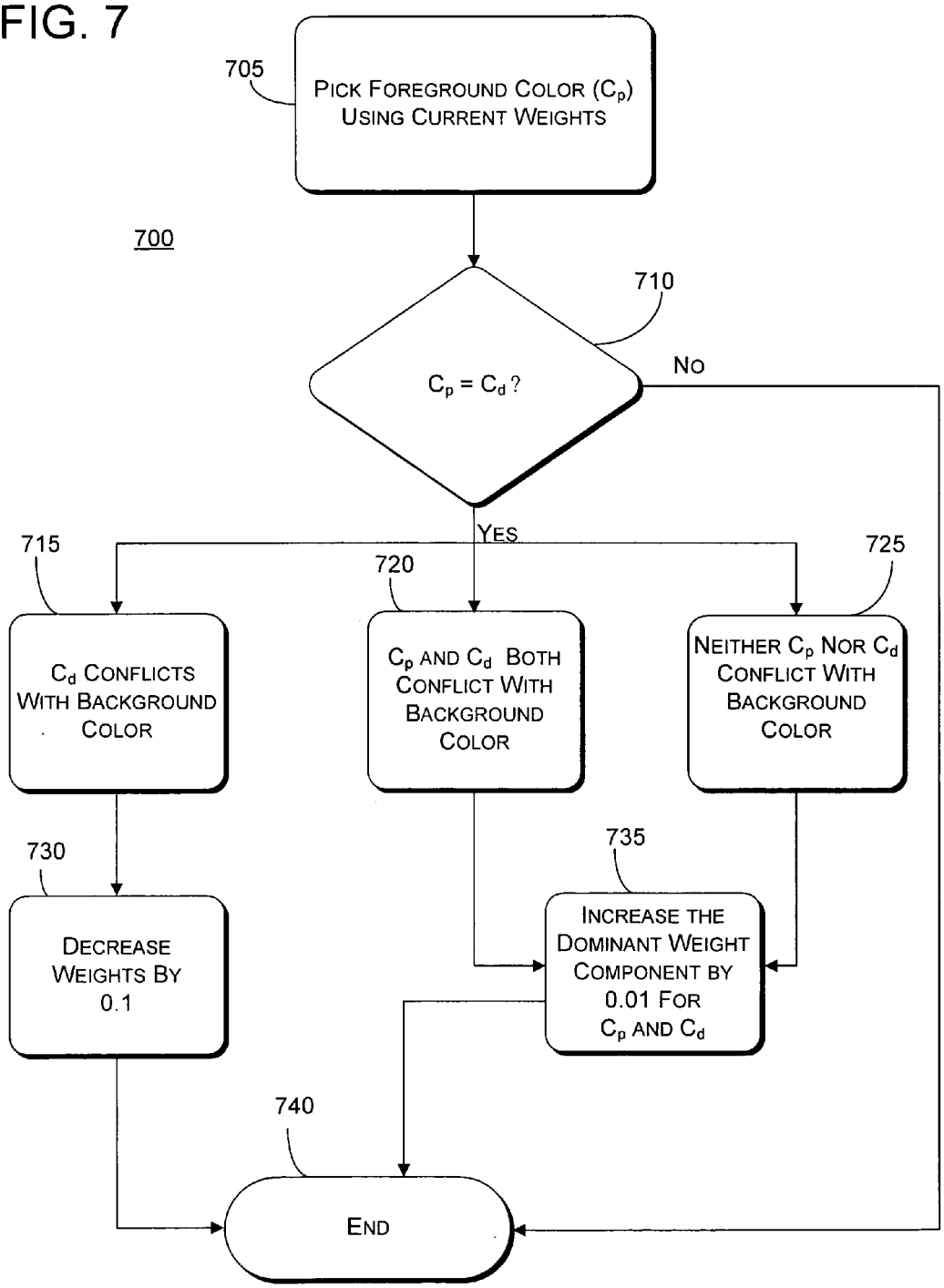
FIG. 7 shows an example processing flow for modifying at least one weight utilized to determine a legibility criterion according to at least one example embodiment.

FIG. 7 shows an example processing flow 700 for modifying at least one of the weights $w_y$, $w_h$, and $w_w$ utilized to determine the legibility criterion (L). Such processing flow may be executed by foreground color picker 220 while choosing 415 at least one contrasting color from a color pool (see FIGS. 2 and 4).

According to example processing flow 700, after a foreground color $C_p$ is picked 705 using existing weights $w_y$, $w_h$, and $w_w$, a determination 710 is made as to whether the picked foreground color $C_p$ is the same as a color $C_d$ that is desired by a tester, for example.

If $C_p$ is determined 710 to not be the same as $C_d$, the processing ends 740 with the existing weights $w_y$, $w_h$, and $w_w$ being maintained.

However, if $C_p$ is determined 710 to be the same as $C_d$, at least three different scenarios may result in any one of the weights $w_y$, $w_h$, and $w_w$ being modified.

If it is determined 715 that the picked color $C_p$ has no conflict with the extracted background color but that the desired color $C_d$ does have such a conflict, all of weights $w_y$, $w_h$, and $w_w$ may be modified 730 by a reduced value of 0.1. The weight modification processing then ends 740.

If it is determined 720 that both the picked color $C_p$ and the desired color $C_d$ do have a conflict with the extracted background color, or if it is determined that neither of $C_p$ and $C_d$ have a conflict with the extracted background color, all of weights $w_y$, $w_h$, and $w_w$ may be modified 735 by reducing the largest of the weights $w_y$, $w_h$, and $w_w$ for the respective colors $C_p$ and $C_d$ by 0.01.

Accordingly, the foreground colors, typically those of a font, in a UI environment may be adapted to provide sufficient legibility relative to corresponding background colors. The example techniques described herein may be utilized in a UI environment in which the background (e.g., "desktop" wallpaper) is changeable or even in a media presentation (e.g., video or slide presentation) for which captions are provided against a changing background. However, it should be noted that the example embodiments described herein may be modified so as to adaptive change displayed background colors, in a similar manner that foreground colors may be adaptively changed according to the example embodiments described above.

Figure 8:
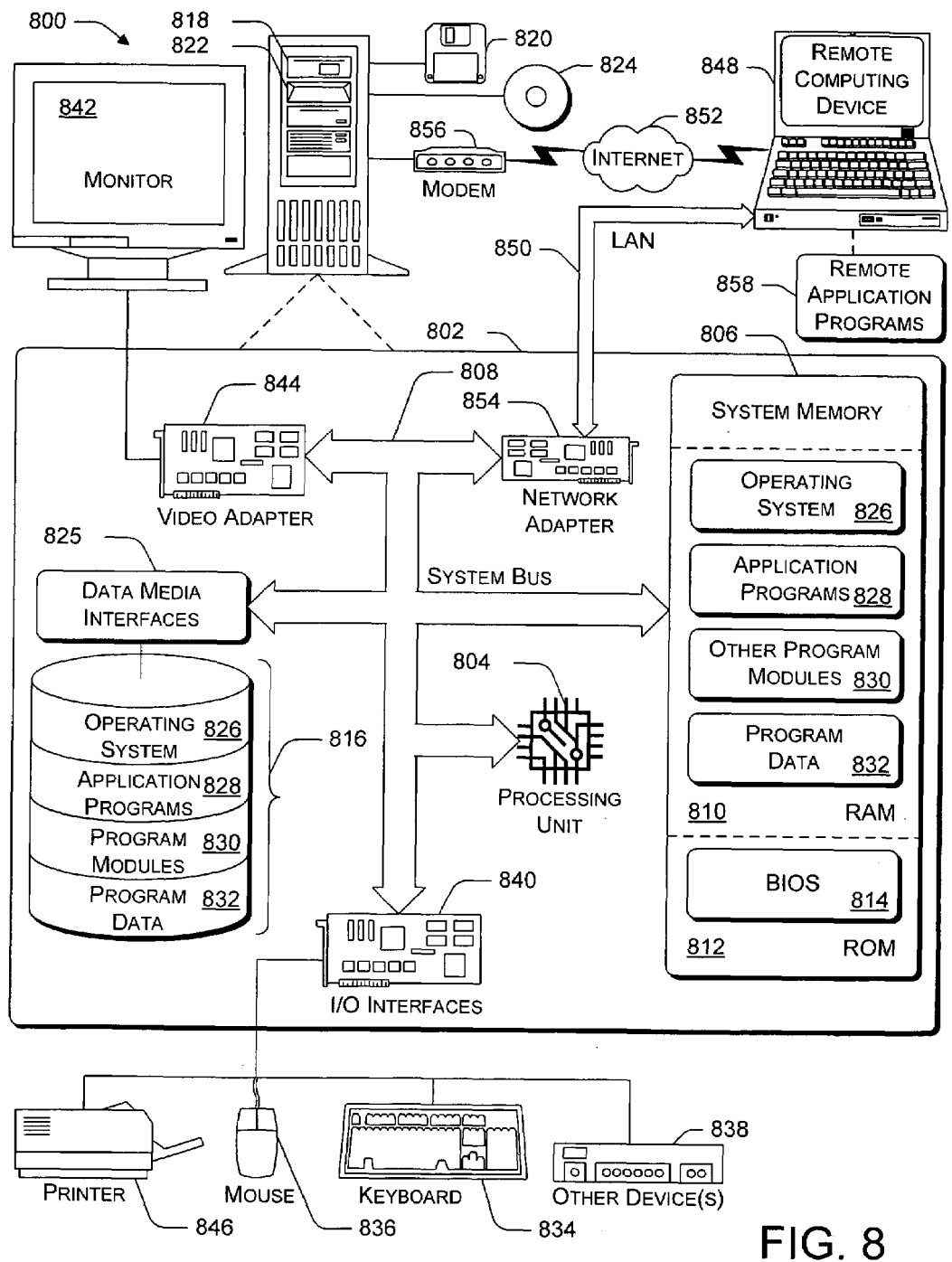
FIG. 8 illustrates an example of a general computer network environment which can be used to implement the techniques described herein.

FIG. 8 illustrates a general computer environment 800, which can be used to implement the techniques described herein. The computer environment 800 is only one example of a computing environment and is not intended to suggest any limitation as to the scope of use or functionality of the computer and network architectures. Neither should the computer environment 800 be interpreted as having any dependency or requirement relating to any one or combination of components illustrated in the example computer environment 800.

Computer environment 800 includes a general-purpose computing device in the form of a computer 802, which may be any of computing devices 105, 115, and 120 (see FIG. 1). The components of computer 802 can include, but are not limited to, one or more processors or processing units 804 (which may include color scheme adaptor 107), system memory 806, and system bus 808 that couples various system components including processor 804 to system memory 806.

System bus 808 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., FireWire, bus.

Computer 802 may include a variety of computer readable media. Such media can be any available media that is accessible by computer 802 and includes both volatile and non-volatile media, removable and non-removable media.

System memory 806 includes computer readable media in the form of volatile memory, such as random access memory (RAM) 810; and/or non-volatile memory, such as read only memory (ROM) 812 or flash RAM. Basic input/output system (BIOS) 814, containing the basic routines that help to transfer information between elements within computer 802, such as during start-up, is stored in ROM 812 or flash RAM. RAM 810 typically contains data and/or program modules that are immediately accessible to and/or presently operated on by processing unit 804.

Computer 802 may also include other removable/non-removable, volatile/non-volatile computer storage media. By way of example, FIG. 8 illustrates hard disk drive 816 for reading from and writing to a non-removable, non-volatile magnetic media (not shown), magnetic disk drive 818 for reading from and writing to removable, non-volatile magnetic disk 820 (e.g., a "floppy disk"), and optical disk drive 822 for reading from and/or writing to a removable, non-volatile optical disk 824 such as a CD-ROM, DVD-ROM, or other optical media. Hard disk drive 816, magnetic disk drive 818, and optical disk drive 822 are each connected to system bus 808 by one or more data media interfaces 825.

Alternatively, hard disk drive 816, magnetic disk drive 818, and optical disk drive 822 can be connected to the system bus 808 by one or more interfaces (not shown).

The disk drives and their associated computer-readable media provide non-volatile storage of computer readable instructions, data structures, program modules, and other data for computer 802. Although the example illustrates a hard disk 816, removable magnetic disk 820, and removable optical disk 824, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 816, magnetic disk 820, optical disk 824, ROM 812, and/or RAM 810, including by way of example, operating system 826, one or more application programs 828, other program modules 830, and program data 832. Each of such operating system 826, one or more application programs 828, other program modules 830, and program data 832 (or some combination thereof) may implement all or part of the resident components that support the distributed file system.

A user can enter commands and information into computer 802 via input devices such as keyboard 834 and a pointing device 836 (e.g., a "mouse"). Other input devices 838 (not shown specifically) may include a microphone, joystick, game pad, satellite dish, serial port, scanner, and/or the like. These and other input devices are connected to processing unit 804 via input/output interfaces 840 that are coupled to system bus 808, but may be connected by other interface and bus structures, such as a parallel port, game port, or a universal serial bus (USB).

Monitor 842 or other type of display device can also be connected to the system bus 808 via an interface, such as video adapter 844. In addition to monitor 842, other output peripheral devices can include components such as speakers (not shown) and printer 846 which can be connected to computer 802 via I/O interfaces 840.

Computer 802 can operate in a networked environment using logical connections to one or more remote computers, such as remote computing device 848. By way of example, remote computing device 848 can be a PC, portable computer, a server, a router, a network computer, a peer device or other common network node, and the like. Remote computing device 848 is illustrated as a portable computer that can include many or all of the elements and features described herein relative to computer 802. Alternatively, computer 802 can operate in a non-networked environment as well.

Logical connections between computer 802 and remote computer 848 are depicted as a local area network (LAN) 850 and a general wide area network (WAN) 852. Such networking environments are commonplace in offices, enterprise-wide computer networks, intranets, and the Internet.

When implemented in a LAN networking environment, computer 802 is connected to local network 850 via network interface or adapter 854. When implemented in a WAN networking environment, computer 802 typically includes modem 856 or other means for establishing communications over wide network 852. Modem 856, which can be internal or external to computer 802, can be connected to system bus 808 via I/O interfaces 840 or other appropriate mechanisms. It is to be appreciated that the illustrated network connections are examples and that other means of establishing at least one communication link between computers 802 and 848 can be employed.

In a networked environment, such as that illustrated with computing environment 800, program modules depicted relative to computer 802, or portions thereof, may be stored in a remote memory storage device. By way of example, remote application programs 858 reside on a memory device of remote computer 848. For purposes of illustration, applications or programs and other executable program components such as the operating system are illustrated herein as discrete blocks, although it is recognized that such programs and components reside at various times in different storage components of computing device 802, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

We claim:

1. At least one computer-readable medium having one or more instructions that, when read, cause one or more processors to:

detect a conflict between a background color and a foreground color in a display environment; and determine a legibility value for a candidate foreground color in relation to the background color in accordance with a legibility criterion; and pick the candidate color from a color pool if the legibility value is greater than a predetermined threshold value for legibility;

wherein:

the legibility criterion further comprises L(foreground, background)=$w(y) \cdot \Delta Y + w(h) \cdot \Delta H + w(w) \cdot \Delta W$;

$\Delta Y$ is a luminance contrast between the background color and the foreground color;

$\Delta H$ is a hue contrast between the background color and the foreground color;

$\Delta W$ is a classification contrast between the background color and the foreground color; and $w(y)$, $w(h)$, and $w(w)$ are weights respectively corresponding to the luminance contrast, hue contrast, and classification contrast.

2. An apparatus, comprising:

an extractor to collect background colors that conflict with displayed foreground colors; and a color picker to select a new foreground color to display in contrast with at least one of the collected background colors by determining a legibility value for a candidate foreground color in accordance with a predetermined legibility criterion, L, wherein:

L(foreground, backaround)=$w(y) \cdot \Delta Y + w(h) \cdot \Delta H + w(w) \cdot \Delta W$;

$\Delta Y$ is a luminance contrast between the background color and the foreground color;

$\Delta H$ is a hue contrast between the background color and the foreground color;

$\Delta W$ is a classification contrast between the background color and the foreground color;

$w(y)$, $w(h)$, and $w(w)$ are weights respectively corresponding to the luminance contrast, hue contrast, and classification contrast.

3. The apparatus according to claim 2, wherein selecting the new foreground color from the color pool includes selecting the non-conflicting color for which the legibility value exceeds a predetermined legibility threshold value.

4. An apparatus for adaptive color scheme changing, comprising:

means for detecting an event in a display environment;

means for means for sampling portions of the display environment to detect a conflict between a displayed background color and a displayed foreground color;

means for changing the displayed foreground color upon detection of the conflict by determining a legibility value for a candidate foreground color in accordance with a predetermined legibility criterion, L, wherein:

$L(\text{foreground}, \text{background}) = w(y) \cdot \Delta Y + w(h) \cdot \Delta H + w(w) \cdot \Delta W$;

$\Delta Y$ is a luminance contrast between the background color and the foreground color;

$\Delta H$ is a hue contrast between the background color and the foreground color;

$\Delta W$ is a classification contrast between the background color and the foreground color; and $w(y)$, $w(h)$, and $w(w)$ are weights respectively corresponding to the luminance contrast, hue contrast, and classification contrast.

5. The apparatus for adaptive color scheme changing according to claim 4, wherein the means for changing the displayed foreground color selects the candidate foreground color as the new foreground color if the legibility value exceeds a predetermined legibility threshold value.

* * * * *